United States Patent [19]

DiBenedetto

[11] Patent Number: 5,192,092
[45] Date of Patent: Mar. 9, 1993

[54] RECYCLING BIN CART

[76] Inventor: Richard DiBenedetto, 27202 S.W. 164th Ave., Homestead, Fla. 33031

[21] Appl. No.: 674,080
[22] Filed: Mar. 21, 1991
[51] Int. Cl.$^5$ .............................................. B62B 1/12
[52] U.S. Cl. .................................... 280/654; 150/154; 220/737; 220/743; 280/47.19; 280/652
[58] Field of Search ...................... 280/47.35, 654, 651, 280/652, 639, 655, 659, 47.19; 150/159, 166, 900, 154, 165; 220/909, 908, 85 H, 23.83

[56] References Cited

U.S. PATENT DOCUMENTS

| 1,021,872 | 4/1912 | Kingsbury | 220/503 |
|---|---|---|---|
| 2,212,053 | 8/1940 | Smith | 280/651 |
| 2,920,900 | 1/1960 | Best | 280/652 |
| 3,074,734 | 1/1963 | Munson et al. | 280/47.35 |
| 3,804,432 | 4/1974 | Lehrman | 280/47.19 |
| 4,236,462 | 12/1980 | Berthier et al. | 280/651 |
| 4,247,130 | 1/1981 | Paterson | 280/654 |
| 4,919,290 | 4/1990 | Wadel | 220/503 |
| 4,941,653 | 7/1990 | Sterner, Jr. | 220/503 |
| 4,954,384 | 9/1990 | Hartwell | 150/165 |
| 5,090,724 | 2/1992 | Fiore | 280/651 |

Primary Examiner—Eric D. Culbreth
Attorney, Agent, or Firm—Malin, Haley, McHale, DiMaggio & Crosby

[57] ABSTRACT

A recycling bin cart having a pair of wheels and rigid vertical support coupled to at least two horizontally supported shelves sized and spaced apart to receive recycling bins with the lower shelf being located close to the ground. The cart is used to transport recycling bins containing different segregated trash such as newspapers is used to reduce the lifting of the recycling bins for people who are physically impaired. The device may be folded when not in use in a collapsed position and also may be covered aesthetically for use in the home or apartment by a decorative covering while still being used for collecting individual segregated trash items.

4 Claims, 3 Drawing Sheets

RECYCLING BIN CART

BACKGROUND OF THE INVENTION

1. Field of the Invention

This invention relates to wheeled carts that are manually actuated by a user and in particular to a recycling bin cart having two or more shelves, each for receiving a different trash bin to reduce the amount of lifting required to accomplish recycling.

2. Description of the Prior Art

Many city and county governments throughout the United States are currently engaged in trash recycling programs. Certain types of the trash are separated into separate bins for reuse or recycling. Of particular concern are heavy trash items such as newspapers and glass. Typically the city or county government provides particularly sized bins, usually rectangular in shape, into which the user is to put only a particular kind of trash. In the case of newspapers or glass, such bins often get very heavy and are difficult for physically infirmed or elderly people to lift or carry it from the house or apartment to the curb for pick-up.

The purpose of the present invention is to provide an economical, sturdy recycling bin cart for mounting and transporting recycling trash bins. The cart is sized so that the trash bin can be readily put onto the cart and wheeled directly to the curb without the interim steps of lifting the bins from the house to the curb. The bin containing heavy materials is located close to the ground for easy removal.

Garbage and waste paper receptacles in combination have been shown in U.S. Pat. No. 1,021,872, issued to Kingsbury, Apr. 2, 1912. Also a combination newspaper and trash receptacle is shown in U.S. Pat. No. 4,941,653, issued to Sterner, Jr., Jul. 17, 1990. Other efforts at recycling include a recycling waste basket U.S. Pat. No. 4,919,290, issued to Wadel, Apr. 24, 1990 for separating types of waste paper.

None of the references cited show an invention that is useful for intermediate transport of the separated trash from a receptacle area at the house or apartment for movement out to the area of pick-up which is usually the curb or sidewalk. Each of the references cited would require individual lifting and movement of the waste articles.

The present invention overcomes these problems by, providing a lightweight wheeled cart having at least two shelves for receiving trash recycling bins, with one shelf for heavy trash such as newspapers located close to the ground. The cart can be wheeled manually out to the trash pick-up area. The bins are easily removed from the cart, especially from the lower shelf.

The cart also includes a top bar frame structure that can support a curtain or cover so that the cart and trash can be aesthetically hidden from view when located in the house. The cart also includes foldable shelves for saving room and convenience.

BRIEF DESCRIPTION OF THE INVENTION

A recycling bin cart for the reception and transport of recycled trash, in particular segregated bins, is disclosed. The recycling bin cart comprises a rigid main U-shaped frame having a pair of joined vertical support members, a rigid axle and a pair of wheels attached to the ends of the axle. An auxiliary frame is connected to the rigid axle vertically. At least two movable shelves are rotatably attached to the auxiliary frame and connectable to the main frame for horizontal mounting in the open position. The shelves are horizontally separated to permit access to bins located on each shelf. Each bin is mounted on each shelf for receiving a different type of trash such as newspapers, glass bottles or other trash. There is sufficient space between the shelves to permit the bin structure and room for placing trash into the respective bin.

The shelves are foldable and collapsible for storage of the cart when the cart is not in use.

The cart includes an upper frame which can be used to support a curtain that vertically covers the sides and top of the cart. The cover may include a flap for access to the bins mounted on the shelves while the unit is covered.

Each shelf is comprised of a rigid, rectangular, frame having a plurality of supporting cross bars for supporting a bin. Each bin is usually a plastic, rigid container of predetermined rectangular shape with raised edges. Each bin rests on the interior frame support members for each shelf. The front portion of the shelf frame includes a locking member on each side to engage the main vertical support with the shelf in the horizontal position, firmly locking the shelf in the horizontal position.

The main support bar may include floor stops to prevent lateral motion of the cart when the shelves are extended, holding the cart in a fixed static position.

Because the universal recycling bins are important for recycling all trash in the future, the present invention is very important to ensure that all citizens utilize the bins. Many people, especially with heavy items such as newspapers, are physically not that able to lift the recycling bin to carry the bin to the outside curb area. The present invention makes the use of standardized trash recycling bins extremely economical, reduces user lifting, saves room and can be cosmetically covered so that when in use in the home does not detract from the aesthetic environment. Because recycling has become a requirement in many areas, the present invention is a necessity for those individuals who are physically unable to carry the individual bins filled with trash. The invention will also encourage everyone to recycle.

The cart in accordance with the present invention may be made from metal or other rigid plastic material.

It is an object of this invention to provide an improved recycling bin cart for transport of bins used in recycling different forms of trash.

It is another object of this invention to provide a cart that can be used to house and transfer receptacle bins for recycling trash, the cart being utilized in the home as the receptacle bin.

It is another object of this invention to provide a recycling bin cart that can be covered aesthetically while being used as a recycling trash bin cart.

Yet still another object of this invention is to provide a cart that allows for recycling bin utilization to reduce or eliminate lifting of heavy recycling bins such as recycling newspapers, and that permits ease of transport of the bins from a home or apartment to a pick-up area.

In accordance with these and other objects which will be apparent hereinafter, the instant invention will now be described with particular reference to the accompanying drawings.

PREFERRED EMBODIMENT OF THE INVENTION

Figure 1:
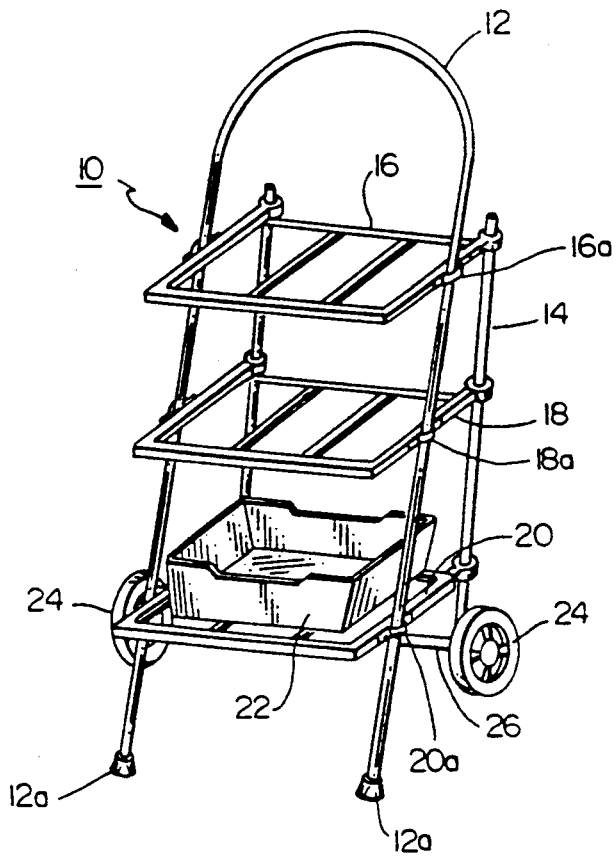
FIG. 1 shows a perspective view of the present invention with a recycling bin located on the lower shelf.

Referring now to the drawings and specifically FIG. 1, the present invention is shown generally at 10 which is a recycling bin cart having a pair of wheels 24 attached to a rigid axle 26 coupled to a rectangular frame 14 that is vertically supported from the axle 26 and has movable shelves 18 and 20 pivotally connected thereto and a top support frame 16 which can be used to support a cover (discussed below), with the two shelves 18 and 20 being movably attached to a U-shaped vertical support 12.

Figure 2:
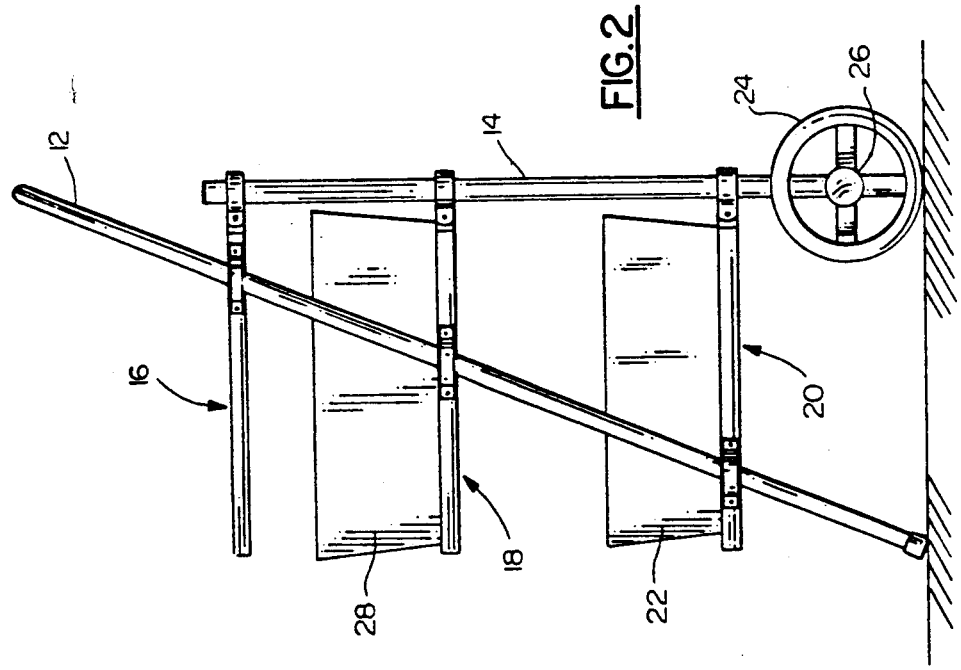
FIG. 2 shows a side elevational view of the present invention show in FIG. 1 with a recycling bin on each shelf of the invention.

As shown in FIGS. 1 and 2, the shelves 18 and 20 are spaced sufficiently apart so that recycling bins 22 and 28 (FIG. 2) rest firmly on shelves 18 and 20. There is sufficient room between the top of each bin 22 and 28 and the shelf or frame above to easily insert newspapers or other segregated trash items as required for recycling. Preferably, the space between shelves 18 and 20, when they are in horizontal position, will equal twice the height of the recycling bin. The bottom shelf is especially spaced so that the bottom bin 22, which rests on shelf 20, would be particularly adapted for receiving newspapers. The reason for placing the newspaper bin on the bottom shelf would be the ease in removing the bin from the cart because of its weight when depositing the bin at the trash pick-up site. Therefore the bottom shelf is spaced a minimal distance above the ground so that the bin with newspapers only must be moved downward a few inches at the pick-up site. Preferably, bottom shelf 20 in the horizontal position is less than six inches from the ground.

Figure 3:
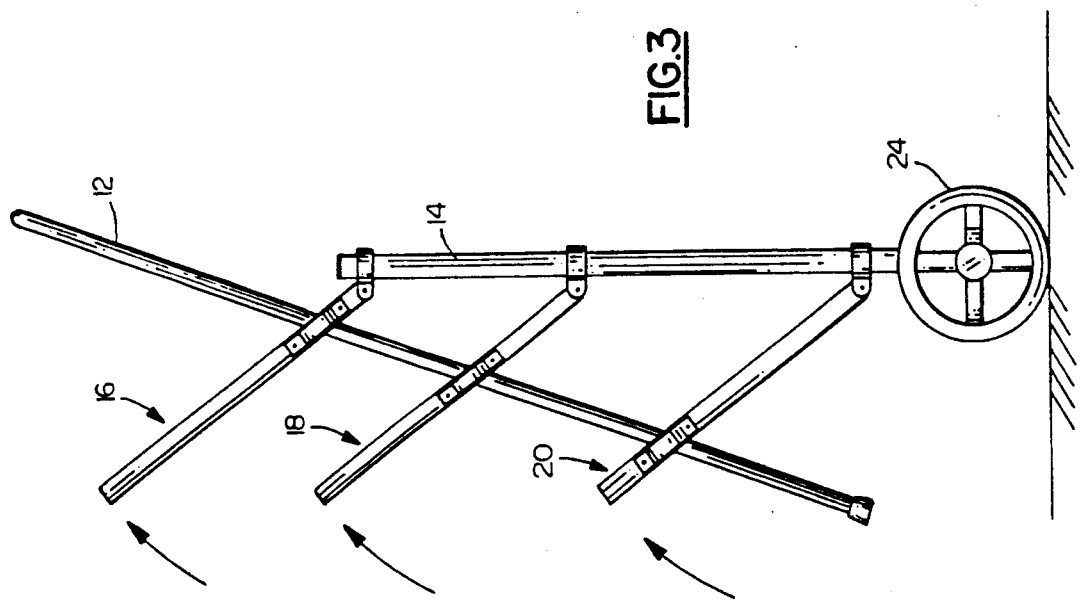
FIG. 3 shows a side elevational view of the present invention partially collapsed.

Each of the shelves 18 and 20 is pivotably attached to the rear frame 14 so that the cart may be collapsed and folded as shown in FIG. 3. The vertical support member 12 is slidably engageable with the shelves and the upper cover support 16 in such a way that it can freely move to allow the shelves to rotate upwardly relative to the frame 14. The frame 14 is attached firmly to the axle 26 which permits the wheels to move while the frame 14 is firmly attached to the axle. Tilting the cart to raise the foot stops frees the cart and wheels for movement of the cart.

Figure 4A:
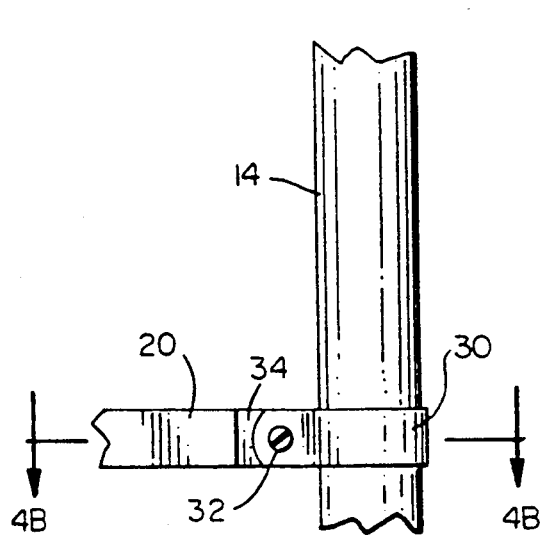
FIG. 4A shows a cut-away side elevational view of the shelf connection to the frame of the present invention.
Figure 4B:
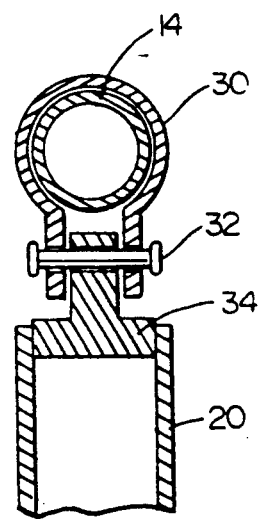
FIG. 4B shows a top cross sectional view through line B—B shown in FIG. 4A.

FIG. 4A and FIG. 4B show how each shelf 18 and 20 is pivotally attached to the rigid frame 14. A band 30 can be attached firmly around frame member 14 and includes a T-shaped connector 34 which fits into the shelf rigid frame member 20 at one end and between the ends of band 30 and is attached by a rivet or screw fastener 32 to the T-shaped member 34. This allows the frame member to pivot freely while firmly holding it in place so that it cannot become disconnected from the frame 14.

The upper frame 16, which is used to support a curtain, may also be connected in the same way to frame 14. The upper frame 16 may also be used as a third bin supporting shelf for areas using three separate recycling bins for newspaper, glass and perhaps tin or aluminum.

Figure 5:
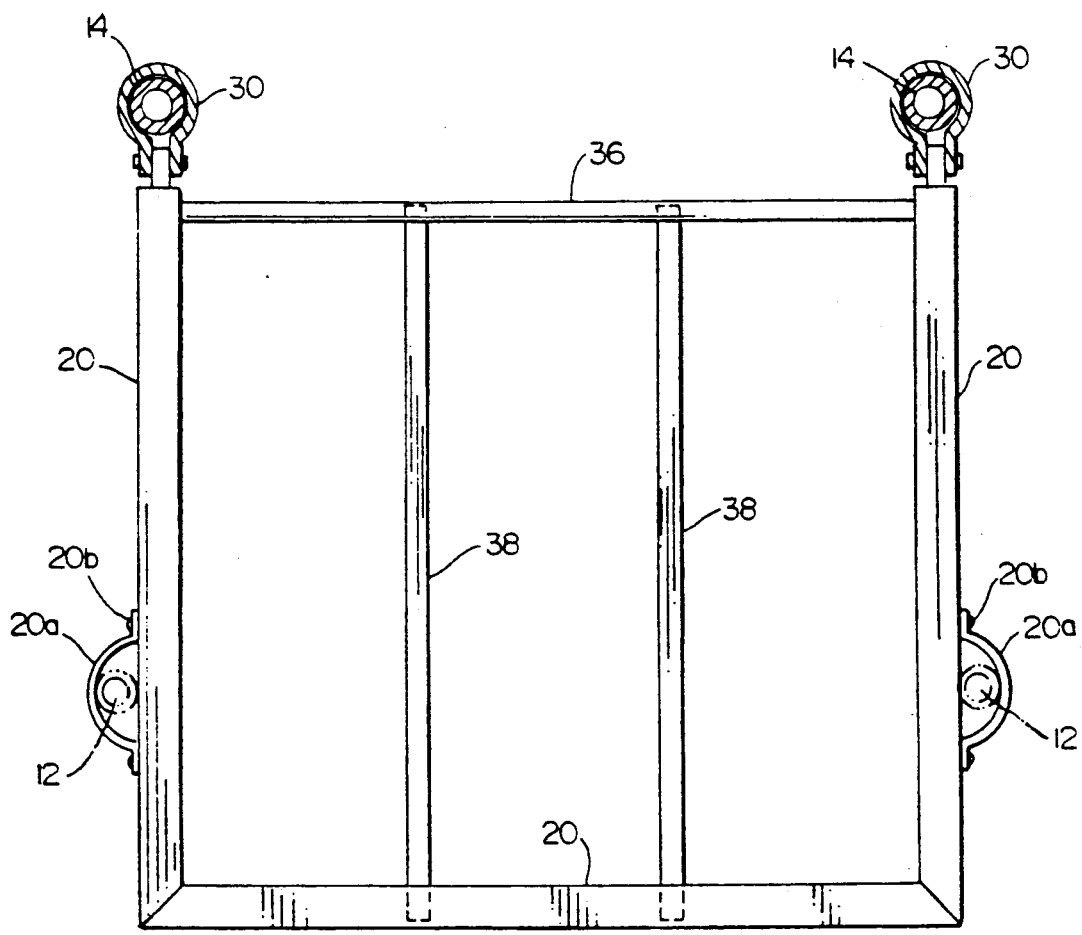
FIG. 5 shows a top plan view of one shelf in accordance with the present invention.

Referring now to FIG. 5, each shelf is constructed as shelf 20 to include additional rigid support bars 36 and 38 attached to a U-shaped rigid frame 20 which itself is coupled to the support frame 14. The additional support bars 36 and 38 may be mounted through apertures in the U-shaped support frame 20 so that they are firmly attached in all positions to hold the recycling bins placed on them. In addition, an elliptically shaped member 20a is attached on each side by screws or rivets 20b which receive the vertical support member 12 shown dotted. There is an area inside member 20a which is non-circular and elliptical which will cause the vertical support member 12 to wedge firmly in place when the shelf is down, acting as a support for the shelf on both sides. Thus when the support member 12 is vertically perpendicular to member 20a it can freely move up and down, but when moved obliquely and the shelf is moved downward by the force of gravity, the support member 12 will be locked together with the shelf 20 acting as a support for the shelf.

Figure 6:
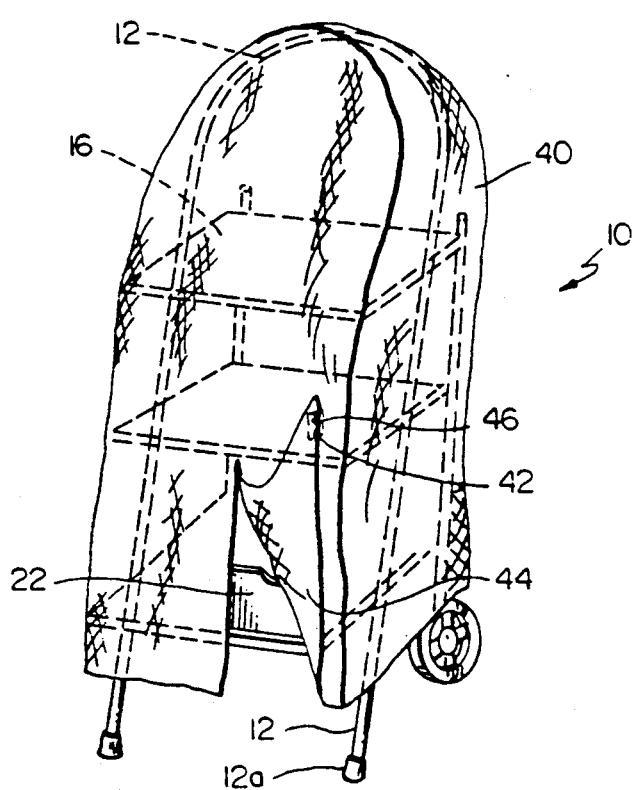
FIG. 6 shows a perspective view of a cover utilized with the present invention.

FIG. 6 shows the present invention 10 with an aesthetic or ornate cover 40 that is shaped and sewn together in panels so that it basically fits over the U-shaped support member 12 and the upper support frame 16 to act as a complete covering of the device. Thus the cart may be utilized in a home or apartment area with storage bins 22 in place underneath cover 40. The cover includes a flap 44 having a fabric fastener 42 on one side of the flap and a corresponding fastener 46 on the outside of the cover so that the flap 44 can be lifted and retained for access to recycling bin 22. When not in use, the flap 44 can be disengaged from the fabric fasteners 42 and 46 so that it covers the unit completely. Fasteners 42 and 46 can be any fastening means known in the art such as velcro hook and loops or snap means. The purpose of the cover is for aesthetics to remove from view recycled trash until the bins are ready to be moved to the transfer and pick-up point.

Referring back to FIGS. 1 and 2, to utilize the present invention, recycling storage bins 22 and 28 for individually segregated trash items such as newspapers, bottles, cans and the like, are placed on each shelf 18 and 20. Preferably the lower shelf would house a newspaper bin 22 because of its closer location to the ground. Once a particular bin is filled, the cart can then be wheeled to the location where the bin is to be placed for emptying and pick-up of the trash. Since the lower newspaper bin is so close to the ground, it can be readily moved without effort by the user from shelf to the ground. This alleviates the heavy loading and carrying typically required for segregating newspapers and the like. When not in use at all, the recycling bin cart may be collapsed as shown in FIG. 3 and hung up and stored in an out-the-way area.

Also when in use in the home or apartment, the cart includes the frame member that supports a cover 40 as shown in FIG. 6 to basically hide the trash from view.

With the use of the present invention a recycling bin cart that is very economical to manufacture and use has been shown. The cart is exceptionally sturdy while being non-complex in construction and greatly aids to reduce lifting of heavy segregated trash items such as newspapers for those who use the cart. The device is also easily usable with steps because of the wheels and construction and includes an aesthetic appearance while used in the house hiding the trash from view. Most importantly, the use of the cart now permits easy recycling by those who may be physically impaired because it alleviates heavy lifting for each segregated trash bin.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A recycling bin cart for storing and transporting a plurality of recycling bins comprising:

a rigid axle; a pair of wheels attached at opposite ends of said rigid axle; a first rigid frame having at least three sides rectangularly disposed and attached for vertical disposition relative to said rigid axle;

first and second movable shelves spaced a predetermined distance apart for horizontal disposition in a working position and sufficiently sized to receive recycling bins with additional space for placing objects in said recycling bins, said first and second shelves attached along one side to said rigid vertical support frame;

a vertical U-shaped frame movably coupled to said first and second shelves, said vertical frame including legs for engaging the ground and a U-shaped handle at the opposite end, said U-shaped frame having a first position, whereby the first and second shelves are horizontally locked in a position and a second position where the first and second shelves are rotated and oriented vertically for a storage position;

a cover support frame mounted above said first two shelves and attached to said rigid vertical frame movably to said U-shaped vertical support frame movably, said cover support frame extended horizontally in the locked position of said vertical frame member; and a decorative covering means shaped to fit over and surround said cart, including a curved portion for engagement with said U-shaped handle of said vertical U-shaped frame and a cylindrical portion to engage said cover support frame;

said cover means including a flap area for access to bins mounted on said cart, said cover means including a fabric fastening means for holding the cover in an open position and disengagement for closing the cover.

2. A recycling bin cart as in claim 1, including:

means, having an elliptical shaped opening, for wedging said U-shaped frame in said first position, said means for wedging attached to the outside of said shelves on each side, said means for wedging having said vertical U-shaped frame disposed therethrough, said means for wedging, in conjunction with said vertical U-shaped frame, providing support to said movable shelves in said first position.

3. A recycling bin cart as in claim 1, wherein:

said first shelf in said first position is less than six inches from the ground, said first and second shelves being spaced apart, in said first position, to allow sufficient space for a recycling bin to be easily and quickly mounted on said lower shelf and for easy access to the recycling bin for depositing newspapers in said recycling bin, said sufficient space between said first and second shelves, in said first position, equal to twice the height of said recycling bin.

4. A recycling bin cart as in claim 1, including:

means, having an elliptical shaped opening, for wedging said U-shaped frame in said first position, said means for wedging attached to the outside of said shelves and said cover frame support on each side, said means for wedging having said vertical U-shaped frame disposed therethrough, said means for wedging, in conjunction with said vertical U-shaped frame, providing support to said movable shelves and said cover frame support in said first position.

* * * * *